June 12, 1945.   J. F. WOLLNER   2,378,349
UNIVERSAL JOINT CONSTRUCTION
Filed Sept. 9, 1943   2 Sheets-Sheet 1
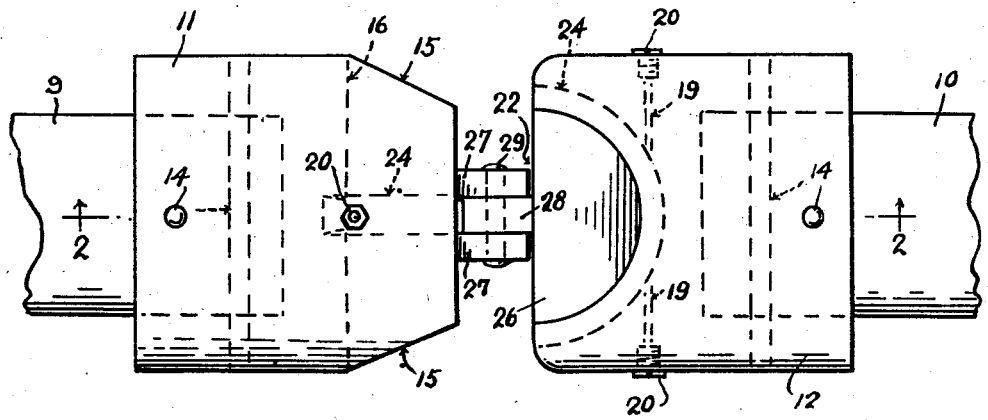
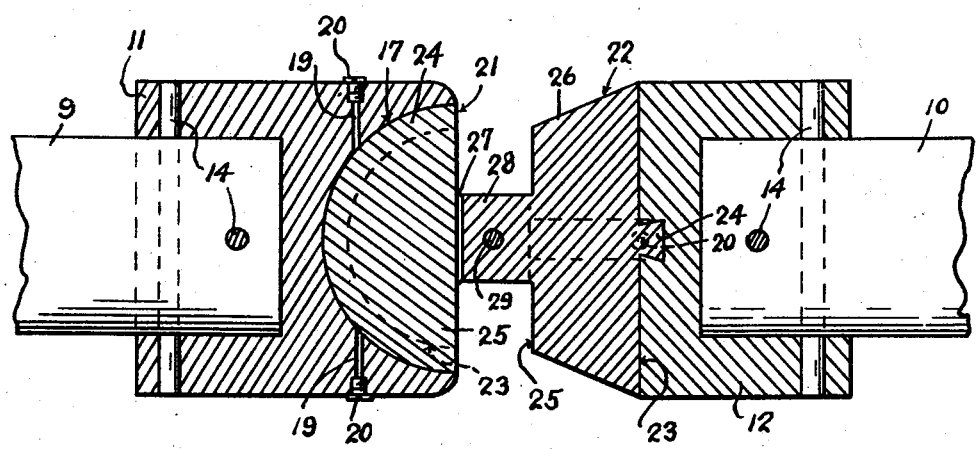
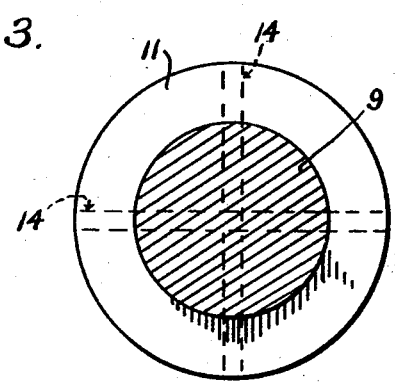
Inventor
Joseph Francis Wollner
By Clarence A. O'Brien
and Harvey B. Jacobson
Attorneys

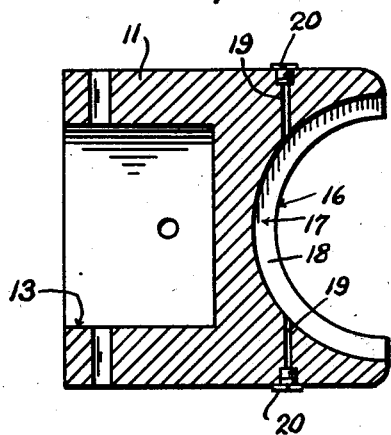
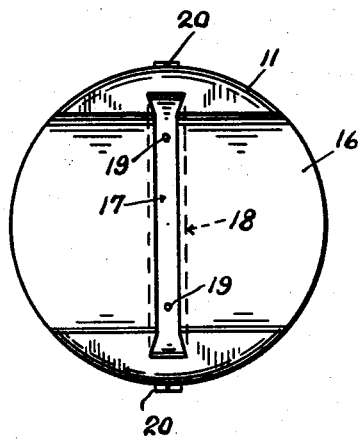
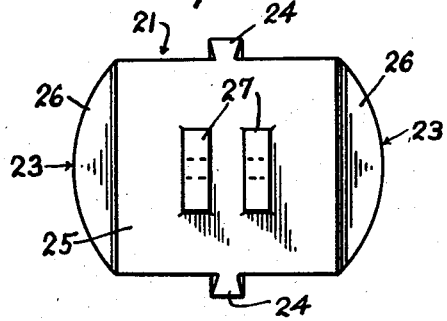
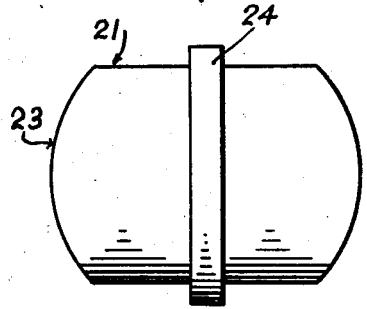
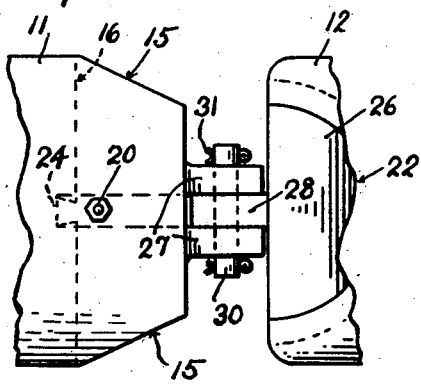
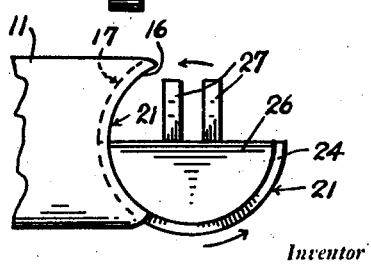

Patented June 12, 1945

2,378,349

UNITED STATES PATENT OFFICE 2,378,349

UNIVERSAL JOINT CONSTRUCTION

Joseph Francis Wollner, Feeding Hills, Mass.

Application September 9, 1943, Serial No. 501,694

4 Claims. (Cl. 64—7)

This invention relates to the class of structures briefly and broadly classified as universal joints, and, as will be hereinafter evidenced, my principal aim is to generally improve upon known types of marketed and patented joint constructions, this being accomplished by a choice and selection of mechanical expedients coacting and interrelated in such a manner as to serve the greatest possible advantage.

Although the style of joint adopted and used is susceptible of incorporation in machinery of many different kinds and types, it is peculiarly adapted for joining shaft-ends of angularly disposable power transmission shafts.

Allowing free lateral and vertical motions in directions at right angles to each other, this improved joint structure is such as to aptly fulfill the requirements of the trade, the preferred embodiment being characterized by duplicate interchangeable hub members applicable to the adjacent ends of the complemental shaft-sections, the opposed end portions of said hub members being expressly designed and equipped with oscillatory block-like adapter elements rockably mounted and readily shiftable in directions at right angles to each other to achieve the desired aims in a highly practical and useful manner.

Another important phase of the invention has to do with the aforementioned oscillatory block-like adapter members mounted in the hub members, said adapter members being secured together by an arrangement of lugs so positioned in relation to other parts as to prevent the adapter members from being dislodged from their seats as long as the respective hub members are thus operatively joined together.

A further object is the provision of a universal joint structure of the type alluded to, which is such as to permit maximum deflection in the angles of the interconnected shaft-sections, and expedient assembling and disassembling of the parts in a manner to minimize wear and the likelihood of failing to function with requisite expediency.

Other features and advantages of the invention will become more readily apparent from the following description and the accompanying illustrative drawings.

In the drawings, wherein like numerals are employed to designate like parts throughout the same:

Figure 1 is a top plan view of a universal joint perfected in accordance with the principles of the present invention showing fragmentary portions of shaft-sections fastened to the hub or body members.

Figure 2 is a longitudinal sectional view taken on the plane of the line 2—2 of Figure 1, looking in the direction of the arrows.

Figure 3 is an end elevation observing the structure in Figure 1 from either right or left, as the case may be.

Figure 4 is a central section through one of the aforementioned hub members per se.

Figure 5 is an end elevation of the structure seen in Figure 4, that is, a view looking at Figure 4 in a direction from right to left.

Figure 6 is a front end or face elevation of one of the flat-faced adapter or coupling elements.

Figure 7 is a view of the same element observing it from the opposite convex or rib-equipped side.

Figure 8 is a fragmentary elevational view showing a slight modification, that is, a cotter key assembling pin coacting with the interfitting lugs.

Figure 9 is a fragmentary detailing elevational view showing a portion of one hub member and the rotary detachable lug equipped adapter element.

Referring first to Figure 1 one shaft section is denoted by the numeral 9 and the complemental shaft section by the numeral 10. The respective head-like body members are denoted by the numerals 11 and 12, respectively. The major portion of each body member is cylindrical in cross-sectional form and provided with a socket 13 into which the shaft-end is projected and fastened by retaining pins 14. The tapered inner end of each body member has diametrically opposite portions of beveled or tapered portion, as at 15. Furthermore, the inner end of each body member is provided with a semi-cylindrical seat 16, said seat having a central transverse groove constituting a semi-circular keyway 17. The side walls of this are undercut, as at 18 to form what may be conveniently designated as a semi-circular keyway of dove-tailed cross-sectional form. This is brought out to advantage in Figures 4 and 5. The passages 19 are lubricant holes and are closed by suitable plugs 20. The companion adapter and the block-like jointing elements are differentiated by the numerals 21 and 22, respectively. Each adapter comprises a block-like body convex, that is, semi-circular, as at 23, on one side, this side being provided with a centrally located dove-tailed rib 24 which constitutes a key to fit shiftably into the keyway 17. The opposed face is flat and smooth, as indicated at 25. The opposite ends are beveled to a desired degree, as indicated at 26. The intermediate area of the flat face 25 of the adapter 21 is provided with a pair of parallel lugs 27 receiving therebetween a single lug 28 on the companion adapter 22. The beveled ends 26 cooperate, obviously, with the beveled portion 15 of the hub part. In Figure 1 we see a rivet 29 piercing and connecting the respective lugs 27 and 28. In the modification seen in Figure 8 there is a simple removable pin 30 utilized as the assembling and connecting element, this being held in place by cotter keys 31. It is to be noted that the length of the lugs is such as to terminate within the imaginary cylinder which will be formed at the convex side 23 and continued the other half way around the block, or, to put it otherwise, the lugs 27 are of a length so that they will clear the semi-circular surface 16 at the time of assembly of the adapter elements in the seats 16. By this arrangement, when the lugs 27 and 28 are pinned or otherwise joined together, they serve as stop elements and prevent the coupling adapters from being dislodged from their respective seats.

This predetermined length of the lugs 27 which allows for the bodily rotation of the adapter elements for applying and removing same is brought out in Figure 9 of the drawings, and it is an important functional fact to be stressed.

A coupling of the construction and configuration herein shown and described has a wide range of adaptability and lends itself admirably well to flexible jointing of shaft ends, allowing the shaft-sections to assume angular positions with respect to each other over a fairly wide path. The construction is capable of being readily maintained in properly working condition, the parts subjected to a minimum of wear in action, and are interchangeable and renewable. The structure as a whole is sturdy and reliable and highly efficient in adaptability and operation.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials, and rearrangement of parts may be resorted to in actual practice so long as no departure is made from the invention as claimed.

I claim:

1. A universal joint construction of the class described comprising a body member having in one end a semi-cylindrical recess constituting an adapter seat and having a centrally arranged transversely disposed groove constituting a keyway, an adapter of semi-cylindrical form mounted for rockable oscillation in said seat and provided with a transverse rib, said rib constituting a key and being slidably mounted in said keyway, a second body member in approximate longitudinal alignment with the first-named body member and provided with a corresponding semi-cylindrical recess constituting an adapter seat and having a centrally arranged transversely disposed groove constituting a keyway, a second adapter of semi-cylindrical form rockably and shiftably mounted for oscillation in second-named adapter seat, and rigid lugs carried by adjacent faces of the respective adapters, said lugs being pinned together.

2. As a new article of manufacture, an adapter coupling element comprising a solid block-like body substantially semi-circular in cross-sectional form having tapered ends and convex and flat faces, the flat face opposed to said convex face, said convex face being provided with a transverse centrally disposed outstanding rib constituting an assembling key, the flat face being provided at its central portion with a pair of outstanding lugs of predetermined lengths.

3. In a device of the class described, a cylindrical body provided in one end with a socket and in the opposite end with a recess, said recess being substantially semi-cylindrical and having a centrally arranged transversely extending groove constituting a semi-circular keyway, a semi-cylindrical adapter fitted in said recess having tapered ends and a flat face, the convex side being provided with a rib fitted into said groove, the flat face being provided with outstanding lugs, the lugs being of a length slightly less than the depth of said recess, in the manner and for the purposes described.

4. In a universal joint construction of the class described, a body provided in one end with a substantially semi-cylindrical recess having a centrally arranged, transversely extended groove constituting a semi-circular keyway, a semi-circular adapter mounted for oscillation in said recess and having tapered ends, and convex and flat faces, the flat face being opposed to the convex face, the convex face being provided with a semi-circular rib fitted slidably in said semi-circular keyway, the flat face being provided with a pair of outstanding lugs, said lugs being of a length slightly less than the depth of the recess, a second body coacting with the first body and having a substantially semi-cylindrical recess and a centrally arranged, transversely extending groove constituting a semi-circular keyway, a second semi-cylindrical adapter fitted in the second-named recess and having tapered ends and convex and flat faces, the flat face being opposed to the convex face, said convex face being provided with a semi-circular rib centrally arranged and fitted in the adjacent semi-circular keyway, said flat face being provided with an outstanding lug, said lug being of a length slightly less than the depth of the second-named recess, and said lug being fitted telescopically between the first-named lugs and being pinned thereto.

JOSEPH FRANCIS WOLLNER.